(12) United States Patent
Millhouse (10) Patent No.: US 10,192,196 B2
(45) Date of Patent: Jan. 29, 2019

(54) SYSTEMS AND METHODS FOR MONITORING PRODUCT RECALLS

(71) Applicant: Walmart Apollo, LLC, Bentonville, AR (US)

(72) Inventor: Andrew B. Millhouse, Gilbert, AZ (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/584,519

(22) Filed: May 2, 2017

(65) Prior Publication Data

US 2018/0150789 A1    May 31, 2018

Related U.S. Application Data

(60) Provisional application No. 62/426,762, filed on Nov. 28, 2016.

(51) Int. Cl.
| | |
|---|---|
| *G06Q 10/08* | (2012.01) |
| *G06Q 10/00* | (2012.01) |
| *G06Q 30/00* | (2012.01) |
| *G06Q 30/02* | (2012.01) |
| *G06Q 50/26* | (2012.01) |
| *G06Q 20/20* | (2012.01) |
| *G06Q 30/06* | (2012.01) |
| *G07G 1/00* | (2006.01) |

(52) U.S. Cl.
CPC ......... *G06Q 10/087* (2013.01); *G06Q 10/30* (2013.01); *G06Q 30/014* (2013.01); *G06Q 30/02* (2013.01); *G06Q 50/26* (2013.01); *G06Q 20/20* (2013.01); *G06Q 30/06* (2013.01); *G07G 1/0054* (2013.01)

(58) Field of Classification Search
CPC .................................................. G06Q 10/087
USPC ............................ 235/383; 705/303, 35, 26.1
See application file for complete search history.

(56) References Cited

U.S. PATENT DOCUMENTS

| | | | |
|---|---|---|---|
| 8,145,574 B1 | 3/2012 | Hancock | |
| 8,370,254 B1 * | 2/2013 | Hopkins, III | G06Q 40/08 705/35 |
| 2007/0069004 A1 | 3/2007 | Adler | |
| 2007/0239502 A1 | 10/2007 | Babu | |

(Continued)

*Primary Examiner* — Allyson Trail
(74) *Attorney, Agent, or Firm* — Fitch, Even, Tabin & Flannery LLP (57) ABSTRACT

In some embodiments, apparatuses and methods are provided herein useful to tracking the handling of product recalls by product distribution centers affected by the recalls. In some embodiments, there is provided a system including: a first electronic interface receiving input of recall information; a second electronic interface at a group of product distribution centers receiving notifications of product recalls; a database configured to receive and store the recall information; and a control circuit configured to: create a record for the product recall; determine the distribution centers having products affected by the recall and assign the recall to those affected distribution centers; transmit a notification to each distribution center having products affected by the recall; receive confirmation of receipt of the notification; receive a disposition of an action of the recall from each affected distribution center; and update the database with the disposition by each affected distribution center.

18 Claims, 4 Drawing Sheets

(56) References Cited

U.S. PATENT DOCUMENTS

| | | |
|---|---|---|
| 2009/0319331 A1* | 12/2009 | Duffy ................ G06F 17/30241 |
| | | 705/7.29 |
| 2011/0093401 A1* | 4/2011 | Waite .................... G06Q 30/014 |
| | | 705/303 |
| 2011/0258065 A1* | 10/2011 | Fordyce, III ........... G06Q 10/10 |
| | | 705/26.1 |
| 2012/0185399 A1 | 7/2012 | Draper |
| 2013/0246217 A1 | 9/2013 | Denton |
| 2013/0254120 A1 | 9/2013 | Waite |
| 2013/0268445 A1 | 10/2013 | Casady |
| 2013/0282593 A1* | 10/2013 | Merz .................. G06Q 30/0601 |
| | | 705/303 |
| 2014/0288943 A1 | 9/2014 | Kaniyur-Subbian |
| 2016/0225198 A1* | 8/2016 | Punjabi .................. G07C 5/008 |
| 2016/0241997 A1* | 8/2016 | Lucas .................... H04W 4/021 |
| 2017/0032332 A1* | 2/2017 | Bell ....................... G06Q 10/20 |
| 2017/0337559 A1* | 11/2017 | Hancock ................ G06Q 10/30 |
| 2018/0064231 A1* | 3/2018 | Chiasson ............ A61M 35/003 |

\* cited by examiner

SYSTEMS AND METHODS FOR MONITORING PRODUCT RECALLS

CROSS-REFERENCE TO RELATED APPLICATION

This application claims the benefit of U.S. Provisional Application No. 62/426,762, filed Nov. 28, 2016, which is incorporated herein by reference in its entirety.

TECHNICAL FIELD

This invention relates generally to the monitoring of product recalls, and more particularly, to the monitoring and disposition of product recalls at product distribution centers.

BACKGROUND

In the retail setting, one challenge is the handling of product recalls that may affect a large number of products. This challenge may be exacerbated if the products are distributed from a subset of product distribution centers from a larger group of distribution centers. These product recalls require that certain action be taken, usually in a relatively short time period, such as, for example, determining the location of products and removing them from inventory.

It is desirable to develop an approach for the efficient handling of product recalls allowing the input of recall information and the input of responses by product distribution centers. In this regard, it is desirable that the recall information be promptly communicated to those distribution centers with products affected by the recall. Further, it is desirable that the actions and dispositions by the affected distribution centers relating to the recall be monitored to make sure that these actions and dispositions are being conducted in a timely manner.

BRIEF DESCRIPTION OF THE DRAWINGS

Disclosed herein are embodiments of systems, apparatuses and methods pertaining to monitoring the handling of product recalls by product distribution centers affected by the product recalls. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to monitoring and disposing of product recalls by product distribution centers affected by the recalls. In one form, there is provided a system including: a first electronic interface configured to receive input of recall information corresponding to a product recall; a second electronic interface at each of a predetermined group of product distribution centers configured to receive notifications of product recalls, each second electronic interface configured to allow access to the recall information by the product distribution centers having products affected by the product recall; a database configured to receive and store the recall information; and a control circuit operatively coupled to the database and the first and second interfaces, the control circuit configured to: create a record for the product recall in the database; determine the product distribution centers having products affected by the product recall and assign the product recall to those affected product distribution centers; transmit a notification regarding the product recall to each product distribution center having products affected by the product recall; receive confirmation of receipt of the notification from the product distribution centers having products affected by the product recall; receive a disposition of an action of the product recall from each product distribution center having products affected by the product recall; and update the database with the disposition by each product distribution center having products affected by the product recall.

In one form, in the system, the first interface may be accessible to receive input regarding the product recall from a central home office and the recall information for each product recall in the database may be accessible by the central home office. Further, the first interface may be accessible to receive input regarding the product recall from one of a predetermined group of vendors and the recall information for other product recalls in the database may not be accessible to the predetermined group of vendors. In addition, the control circuit may be configured to transmit recall information inputted by a vendor to a central home office for approval prior to the control circuit transmission of a notification regarding the product recall to each product distribution center having products affected by the product recall.

In one form, the recall information may include at least one of a subject of the product recall, a recall classification, a reason for the product recall, documents relating to the product recall, and product recall instructions. Also, the control circuit may be further configured to determine each product type affected by the product recall and to record the time of the disposition for each product type of the product recall by each product distribution center having products affected by the product recall. Moreover, the database may include a cloud-based database communicatively coupled to a website server configured to serve as a platform for the input of the recall information and for the input of actions taken by each product distribution center having products affected by the product recall.

In one form, in the system, the second interface at each product distribution center having products affected by the product recall may be configured to input information regarding actions taken by each product distribution center including at least one of the number of product units affected by the product recall, products held and not shipped, inspection status of the products, products removed from inventory, products returned to a vendor for refund or modification, destruction of products, and permitted donation of products or portions thereof. Further, the control circuit may be configured to: receive a product identifier for the product that is the subject of the product recall; access at least one inventory database with inventory data for each product distribution center of the predetermined group of product distribution centers; and search the at least one inventory database for the product identifier to determine the product distribution centers with products affected by the product recall. In addition, the control circuit may be configured to track the completion of a predetermined group of actions and the disposition status of the actions by the product distribution centers with products affected by the product recall.

In another form, there is provided a method for tracking the handling of product recalls by product distribution centers affected by the product recalls, the method including: by a first electronic interface, receiving input of recall information corresponding to a product recall; by a second electronic interface at each of a predetermined group of product distribution centers, receiving notifications of product recalls; by the second electronic interface, allowing access to the recall information by the product distribution centers having products affected by the product recall; by a database, receiving and storing the recall information; and by a control circuit: creating a record for the product recall in the database; determining the product distribution centers having products affected by the product recall and assigning the product recall to those affected product distribution centers; transmitting a notification regarding the product recall to each product distribution center having products affected by the product recall; receiving confirmation of receipt of the notification from the product distribution centers having products affected by the product recall; receiving a disposition of an action of the product recall from each product distribution center having products affected by the product recall; and updating the database with the disposition by each product distribution center having products affected by the product recall.

Figure 1:
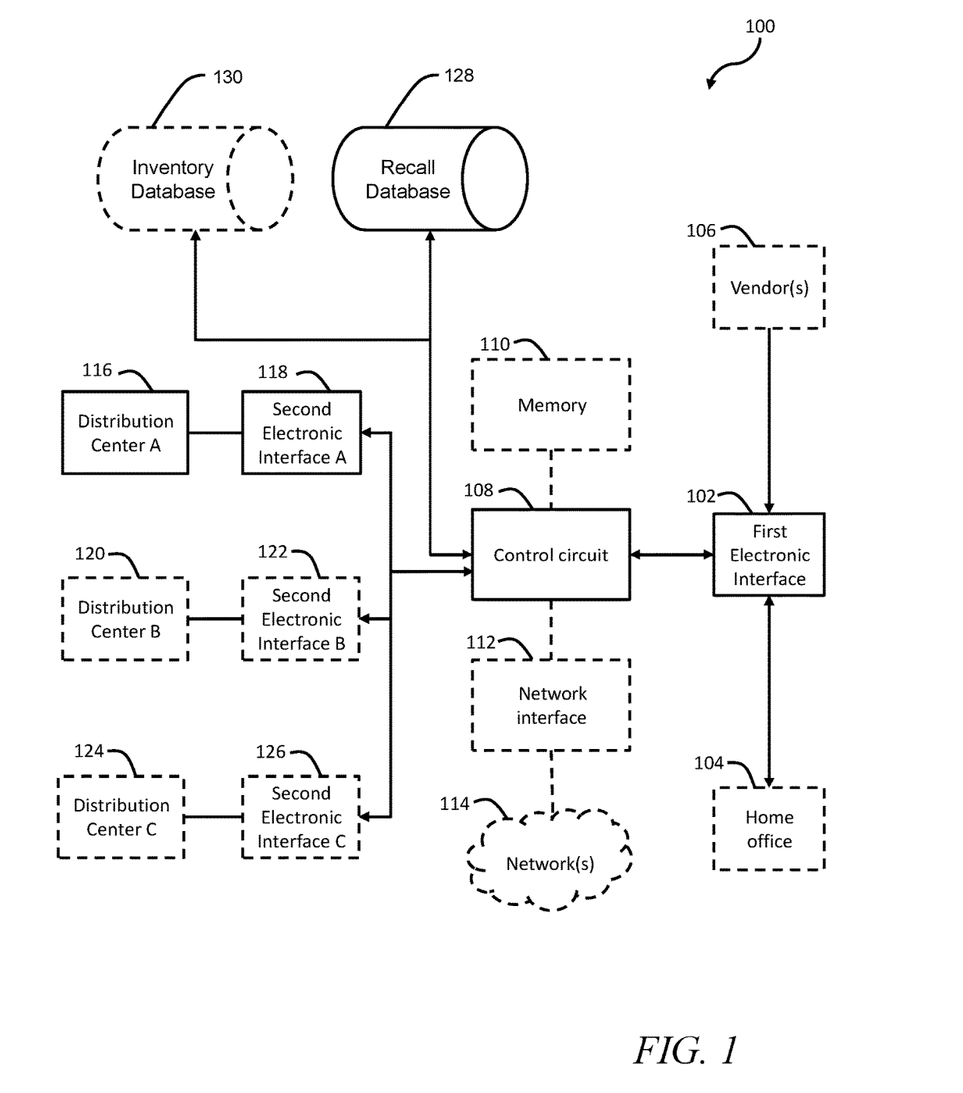
FIG. 1 is a block diagram in accordance with some embodiments.

FIG. 1 is a block diagram showing components of a system 100. As addressed further below, the system 100 is for automating the handling of a product recall allowing the input of the recall and of the responses by affected distribution centers. The system 100 is generally configured to determine a subset of distribution centers with products affected by the recall, notify the affected distribution centers of the recall, and monitor the affected distribution center's handling and disposition(s) of the recall.

The system 100 includes a first electronic interface 102 configured to receive input of recall information corresponding to the product recall. In one form, it is generally contemplated that the first electronic interface 102 may receive recall information from a centralized location, such as from the home office 104 of a retailer having multiple product distribution centers (i.e., the first electronic interface 102 faces the home office 104). In other words, the first electronic interface 102 may be accessible to receive input regarding the product recall from the home office 104, and the recall information for each product recall may be accessible by the home office 104. In this form, the home office 104 may be responsible for inputting the information regarding the product recall, and it is generally contemplated that the home office 104 would have access to all of the information in a database 128 regarding multiple product recalls.

In another form, it is contemplated that the first electronic interface 102 may receive recall information directly from vendors 106 (i.e., be "vendor facing"), who sell products affected by the recall or who might otherwise be affected by the recall. In this form, the first electronic interface 102 may be accessible to receive input about the product recall by a vendor 106 (possibly from a pre-approved list of vendors), but the recall information for other product recalls would not be accessible to the vendors 106. Also, the information inputted by a vendor 106 may be transmitted and/or approved by the home office 104 as an initial screening step to ensure the quality of the recall information.

In one form, the first electronic interface 102 may receive recall information from both the home office 104 and vendors 106. Some recalls may be initiated by the home office 104, while others may be initiated by vendors 106. In another form, for a given recall, some aspects of the recall information may be received from vendors 106, while other aspects may be received from the home office 104. In some forms, recall information inputted by a vendor 106 may be initially transmitted to the home office 104 for consideration and/or approval prior to the transmission of a notification regarding the product recall to product distribution centers having products affected by the product recall.

The system 100 also includes a control circuit 108 that is communicatively coupled to the first electronic database 102. Being a "circuit," the control circuit 108 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 108 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 108 is configured (for example, by using corresponding programming as will be well understood by those skilled in the art) to carry out one or more of the steps, actions, and/or functions described herein.

By one optional approach, the control circuit 108 operably couples to a memory 110. This memory 110 may be integral to the control circuit 108 or can be physically discrete (in whole or in part) from the control circuit 108, as desired. This memory 110 can also be local with respect to the control circuit 108 (where, for example, both share a common circuit board, chassis, power supply, and/or housing) or can be partially or wholly remote with respect to the control circuit 108 (where, for example, the memory 110 is physically located in another facility, metropolitan area, or even country as compared to the control circuit 108).

This memory 110 can serve, for example, to non-transitorily store the computer instructions that, when executed by the control circuit 108, cause the control circuit 108 to behave as described herein. As used herein, this reference to "non-transitorily" will be understood to refer to a non-ephemeral state for the stored contents (and hence excludes when the stored contents merely constitute signals or waves), rather than volatility of the storage media itself, and hence includes both non-volatile memory (such as read-only memory (ROM)) as well as volatile memory (such as an erasable programmable read-only memory (EPROM).)

In this example, the control circuit 108 also operably couples to a network interface 112. So configured, the control circuit 108 can communicate with other elements (both within the system 100 and external thereto) via the network interface 112. Network interfaces, including both wireless and non-wireless platforms, are well understood in the art and require no particular elaboration here. This network interface 112 can compatibly communicate via whatever network or networks 114 may be appropriate to suit the particular needs of a given application setting. Both communication networks and network interfaces are well understood areas of prior art endeavor and therefore no further elaboration will be provided here in those regards for the sake of brevity.

In one form, the control circuit 108 is also communicatively coupled to one or more second electronic interfaces 118, 122, 126. Each electronic interface corresponds to a product distribution center, and the second electronic interface may be located at or be remote from a specific product distribution center. Each second electronic interface is configured to receive notifications of product recalls, and each second electronic interface is arranged to allow access to recall information by specific product distribution centers having products affected by the product recall. In other words, only some of the product distribution centers may be affected by a product recall (i.e., have products that are the subject of a recall), so only these product distribution centers need be provided with that recall information. FIG. 1 specifically shows three product distribution centers affected by the recall and the corresponding second electronic interfaces (Distribution Center A (116) and Second Electronic Interface A (118), Distribution Center B (120) and Second Electronic Interface B (122), and Distribution Center C (124) and Second Electronic Interface C (126)), but it should be evident that the system 100 may include many more distribution centers and interfaces (that may or may not be affected by a particular recall). The system 100 further includes a recall database 128 that is configured to receive and store recall information.

Initially, the control circuit 108 is configured to create a record for the product recall in the recall database 128. It is generally contemplated that the product recall will include specific types of information. For example, this recall information may include information regarding the subject of the product recall, recall classification(s), reasons for the product recall, documents relating to the product recall, and and/or specific product recall instructions for distribution centers.

The control circuit 108 may then determine the product distribution centers 116, 120, 124 having products affected by the product recall and may assign the product recall to those affected product distribution centers 116, 120, 124. For example, in one form, the control circuit 108 may first determine and receive a product identifier corresponding to the product that is the subject of the product recall (which may be received from vendors 106 or may be determined by the home office 104). The product identifiers may be in any of various forms, such as alphanumeric model strings, universal product codes/barcodes, general product category or type, manufacturer or vendor identification, etc. Further, the control circuit 108 may then access an inventory database 130 with inventory data for each product distribution center and may search the inventory database 130 for the product identifier to determine the specific product distribution centers 116, 120, 124 with products affected by the product recall. It is generally contemplated that there may be one centralized inventory database 130 with comprehensive inventory data for all of the distribution centers or that there may be multiple separate inventory databases 130 with each inventory database 130 being associated with one or more specific distribution centers.

The control circuit 108 transmits a notification regarding the product recall to each product distribution center 116, 120, 124 having products affected by the product recall. As should be evident, this notification may be accomplished in a number of ways. For example, the notification may simply be in the form of an email or text message to the second electronic interfaces 118, 122, 126. Alternatively, this notification may involve some sort of log in at the second electronic interfaces 118, 122, 126 and subsequent download of an alert. The control circuit 108 receives confirmation of receipt of the notification from the product distribution centers 116, 120, 124 having products affected by the product recall.

Following receipt of the notification and the product recall information, the affected product distribution centers 116, 120, 124 will then take actions to address the product recall. Some of the actions by the affected product distribution centers 116, 120, 124 may include, without limitation, determining the number of product units affected by the product recall, holding and not shipping products, inspecting the products, removing products from inventory, returning products to a vendor for refund or modification, destroying products, and permitting the donation of products or portions thereof. It is generally contemplated that some of these actions may be set forth in instructions included with the recall information. It is further contemplated that the instructions included with the recall information may also provide one or more due dates for disposition of certain actions.

In one form, it is contemplated that the actions required by the product recall are completed by an affected product distribution center. The control circuit 108 is configured to receive one or more dispositions of actions from each product distribution center 116, 120, 124 having products affected by the product recall. In one form, product type and the time of disposition of the product recall by each distribution center are tracked. For example, the home office 104 or affected distribution centers 116, 120, 124 may determine each product type affected by the recall. Further, the control circuit 108 may be configured to record the times of the dispositions for each product type of the product recall by affected product distribution centers 116, 120, 124. In other words, the control circuit 108 may track the completion of one or more actions and the overall disposition status of the product recall by the affected product distribution 116, 120, 124. Following each disposition, the control circuit 108 may update the recall database 128 with the disposition by the affected product distribution centers 116, 120, 124.

In addition, it is generally contemplated that the system 100 may make use of a cloud-based database and website platform. In one form, the recall database 128 may be a cloud-based database communicatively coupled to a website server configured to serve as a platform for the input of the recall information and for the input of actions taken by each product distribution center having products affected by the product recall. For example, vendors 106 and the home office 104 may be allowed to access the website through a log in and/or software application. As addressed above, the vendors 106 may have limited access in which they are simply permitted to input their recall information, while the home office 104 may be provided with full access to the recall database 128. The product distribution centers 116, 120, 124 may access this website in a similar manner via second electronic interfaces 118, 122, 126. The product distribution centers 116, 120, 124 may be provided with full access to the recall database 128 or may be limited to recalls that directly affect them.

In one form, it is contemplated that the system 100 may be an automated system for dynamically identifying recall trends and recall response timeliness by distribution centers. The system 100 may include a graphical interface-based dashboard that: enables vendors to enter their product recalls; designates distribution centers tasked with returning the products associated with a recall back to the vendor; tracks all actions taken (or scheduled to be taken) at a distribution center assigned with handling a recall-associated product; and enables entry of a time stamp when any action with respect to a recall-associated product is taken. The dashboard may sort all tracking data and generate reports regarding product recalls and actions taken at distribution centers to address product recalls. The dashboard may provide metrics associated with distribution center response times to recalls as well as vendor trends with respect to recalls.

The system 100 may provide reporting or intelligence discovery tools for identifying trends with recalls and response timeliness with distribution centers. It may offer dynamic reporting on distribution center response times, solutions, and vendor trends. It may require itemized and individual responses/dispositions for each item number affected. The system may require vendors to enter their own recalls and eliminate the need for a home office to enter these. Instead, employees at a home office may simply monitor responses and reporting.

Figure 2:
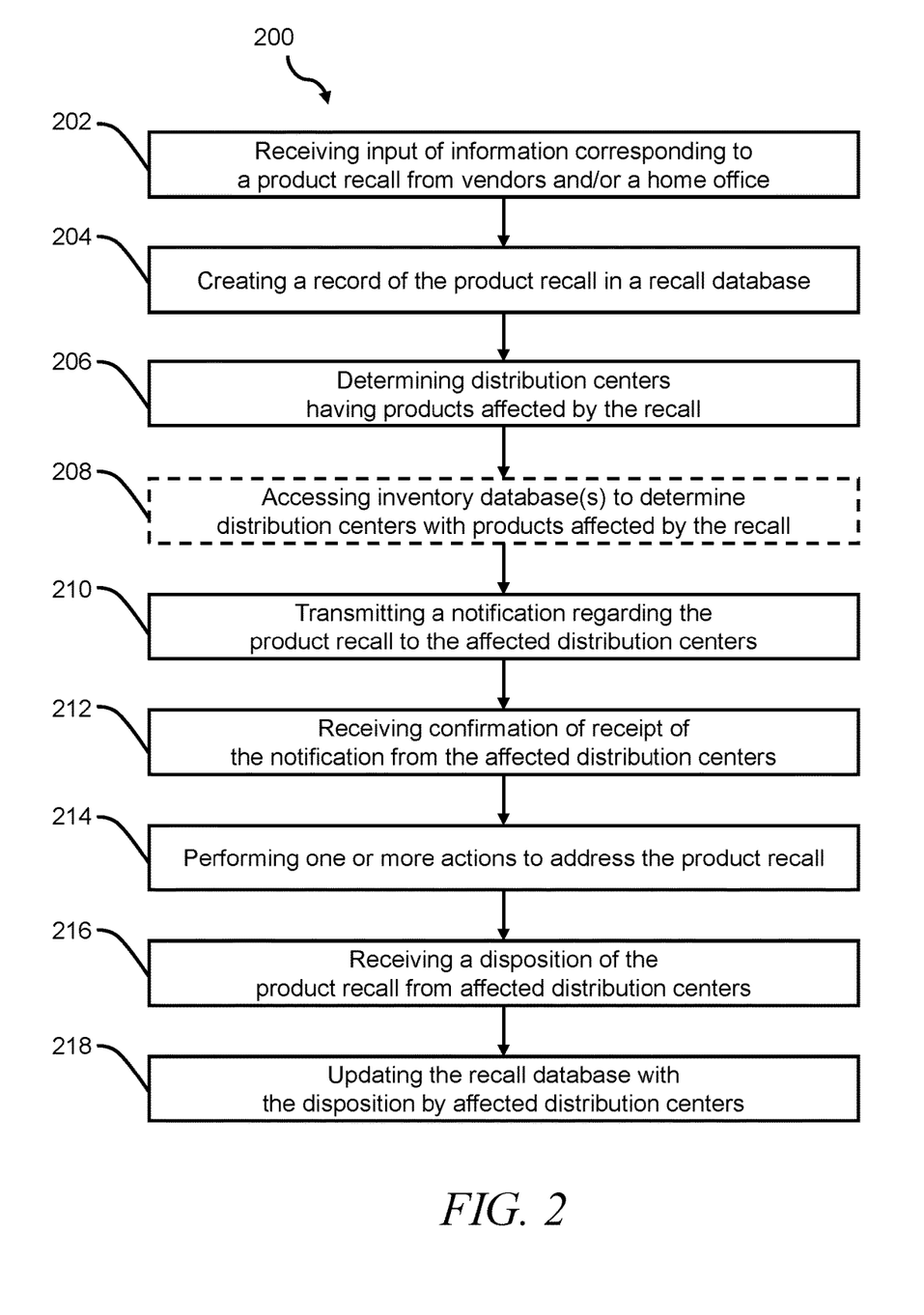
FIG. 2 is a flow diagram in accordance with some embodiments.

Referring to FIG. 2, there is shown a process 200 for monitoring a product recall affecting some distribution centers, which may be operated by a retailer. The process 200 may use some or all of the components of the system 100. The process generally involves receiving recall information from a home office and/or vendors, determining and notifying affected distribution centers, and tracking some or all of the actions taken and the disposition(s) of these actions and of the recall.

At block 202, information corresponding to a product recall is received from vendors and/or the home office. In one form, the home office is some sort of centralized location for the handling of product recalls, such as of a retailer having multiple product distribution centers. It is generally contemplated that vendors may be provided limited access to a recall database and/or website for the submission of recall information, while the home office is provided full access. In one form, certain initial recall information may be received from a vendor, and this information may be supplemented by the home office. For example, the vendors might provide information regarding the products generally subject to the recall and the reason for the recall, and the home office might provide supplemental information regarding the recall classification, the specific products (model numbers) subject to the recall, documents relating to the recall, and instructions for handling the recall.

At block 204, a record of the product recall is created in a recall database. In one form, it is generally contemplated that this record is created at the home office. However, in another form, it is contemplated that a vendor may be able to initiate a recall and create a record. Further, it also may require the input of certain specific types of recall information.

At block 206, distribution centers having products affected by the recall may be determined. In one form, as shown at block 208, one or more inventory databases may be accessed to determine distribution centers with products affected by the recall. For example, a vendor may provide a general product type that is the subject of the recall, and the home office may determine corresponding specific product identifiers for that general product type, such as alphanumeric model strings, universal product codes/barcodes, general product category or type, manufacturer or vendor identification, etc. Alternatively, a vendor might provide the specific product identifier(s) directly. The inventory database(s) may then be accessed and searched to determine the product distribution centers having inventory for the identified products, i.e., having inventory for products with the relevant product identifiers. In one form, inventory database(s) may be accessed and searched to determine if product distribution centers have any of the identified product in inventory and amount of such inventory (of if they might be expected to or scheduled to receive any of such recalled product in the near future).

At block 210, a notification regarding the product recall is transmitted to the affected distribution centers, i.e., distribution centers having or expecting some of the recalled product. The notification may be in any of various forms, such as emails, texts, alerts, etc. It is further contemplated that this notification may also include some recall information, such as the specific products (with product identifiers) subject to the recall, documents relating to the recall, and instructions for handling the recall. Alternatively, the notification may direct a user to a link, website location, or the recall database for accessing this information. At block 212, a confirmation of receipt of the notification is received from the affected distribution centers.

At block 214, one or more actions are performed by an affected distribution center to address the product recall. In one form, it is contemplated that the recall information transmitted to affected distribution centers may include specific instructions for handling the recall. Alternatively, or in addition, it may be contemplated that the affected distributions propose specific procedures for handling the recall. These actions and/or procedures may include, without limitation, determining the number of individual units affected by the product recall that are present at or in route to the distribution center, holding and preventing the shipment of products subject to the recall, inspecting the products themselves (which may determine which of the products should be held), removing products from inventory, returning products to a vendor for a refund or for modification to correct a defect, destroying products that cannot be modified or it would not cost effective to modify, and permitting the donation of products or portions thereof that cannot be salvaged in their entirety.

At block 216, a disposition of the product recall is received from the affected distribution centers. In one form, it is contemplated that the home office might provide multiple due dates for completion (or disposition) of various stages of the product recall. For example, there might be separate due dates for locating the products subject to the recall at the distribution center, completing inspection of the products, and completing the destruction of appropriate products. In addition, when all of the recall actions are completed, it is contemplated that a final disposition may be provided that indicates completion of some or all of the instructed actions or that otherwise indicates the procedures and/or actions taken by the affected distribution center. The times of these disposition(s) may be recorded (time stamped) so that data trends regarding the completion of various actions (and of the entire product recall itself) for different distribution centers may be collected and analyzed in terms of timeliness and other variables. At block 218, the recall database may be updated with the disposition(s) by the affected distribution center.

Figure 3:
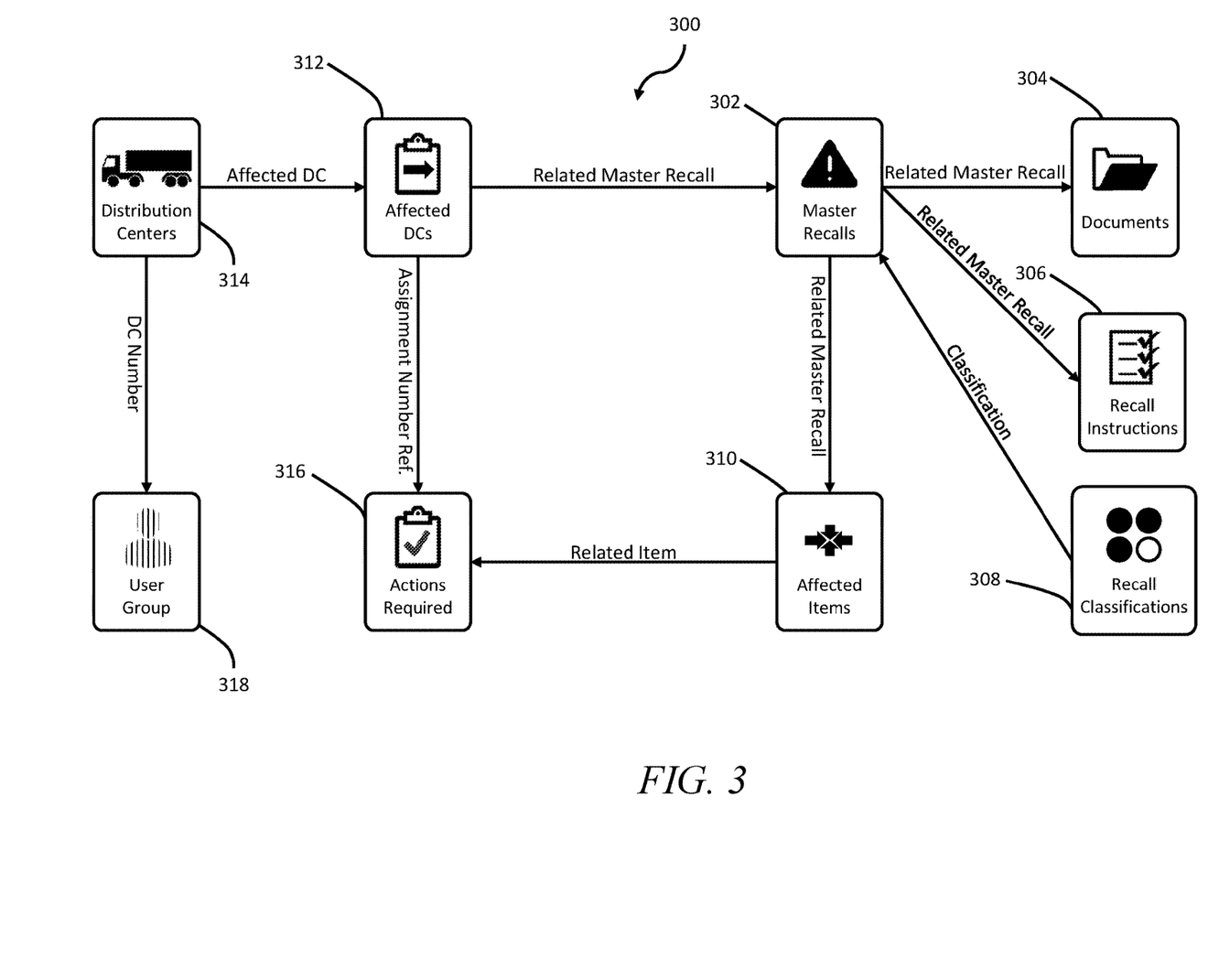
FIG. 3 is a schematic representation in accordance with some embodiments.

FIG. 3 shows a system 300 for handling product recalls illustrating one example of the interrelationship of various components. More specifically, FIG. 3 shows the general relationship of a "master recall" (which may be generated based on vendor information and generated at a home office) to recall actions taken at affected distribution centers. It also shows information that is collected and the communication between various parts of the system 300. System 300 may generally incorporate the components included in system 100 and the steps included in process 200.

Initially, a "master recall" record 302 is created that includes the information relating to the recall. As addressed above, the recall process may be initiated when receiving a recall notification from a vendor that may include generally the products that are the subject of the recall and the nature of the recall. This information may also include, for example, who is the product manufacturer and the time of the notification. In one form, a home office (or centralized location) may then attach this information and additional information relating to the recall (shown on the right side of FIG. 3), which may include recall documents 304, recall instructions 306, and recall classifications 308. In one form, recall classifications 308 may be in the manner of a reference table including specific statements that may need to be used in connection with a specific recall, such as, for example, statements that a certain type of use of affected products may lead to damage or injury. Also, as addressed above, the specific affected items 310 (i.e., product identifiers) may be determined and included with the master recall 302.

As addressed above with respect to system 100, the affected distribution centers 312 are determined from the complete list of distribution centers 314. In one form, the affected distribution centers 312 may be determined by making an initial determination of the specific products affected by the product recall and then conducting an inventory database search to determine distribution centers having these specific products. The affected distribution centers 312 then complete the required actions 316 (i.e., what needs to be done), which may be determined and instructed by the home office and/or may be determined by the affected distribution centers 312. Further, each required action 316 may also include the recording of notes and the disposition(s) of actions, and the master recall record 302 may be updated with this information. This data may be used to track the progress of the affected distribution centers 312, such as determining that a certain percentage of the affected distribution centers 312 have completed a specific, instructed action and calculating the percentage completion of all actions at any particular time. User groups 318 may be added and given access to view the status and progress or recalls at specific distribution centers 314.

As stated above, the disposition(s) may occur in various forms. In one form, the individual dispositions of individual actions are recorded by the distribution centers and may be communicated to a home office or recall database. In another form, depending on the number of product units affected by the recall, these dispositions may be applied to the handling of each individual unit. This approach may not be feasible if the recall involves a large number of units. In yet another form, the disposition may in the manner of a final disposition when all of the actions required by the recall are completed.

As addressed with respect to system 100, in one form, it is generally contemplated that users may log in to have access to a website or software application and cloud-based database. Vendors may be provided with limited access to input information relating to a specific recall, while other users (i.e., employees of a retailer) may be given greater varying degrees of access to input recall information, to access dispositions, to access recalls handled by specific distribution centers, to access all recalls handled by all distribution centers, etc. Information and updates may be communicated in any appropriate manner, such as emails, texts, etc.

Figure 4:
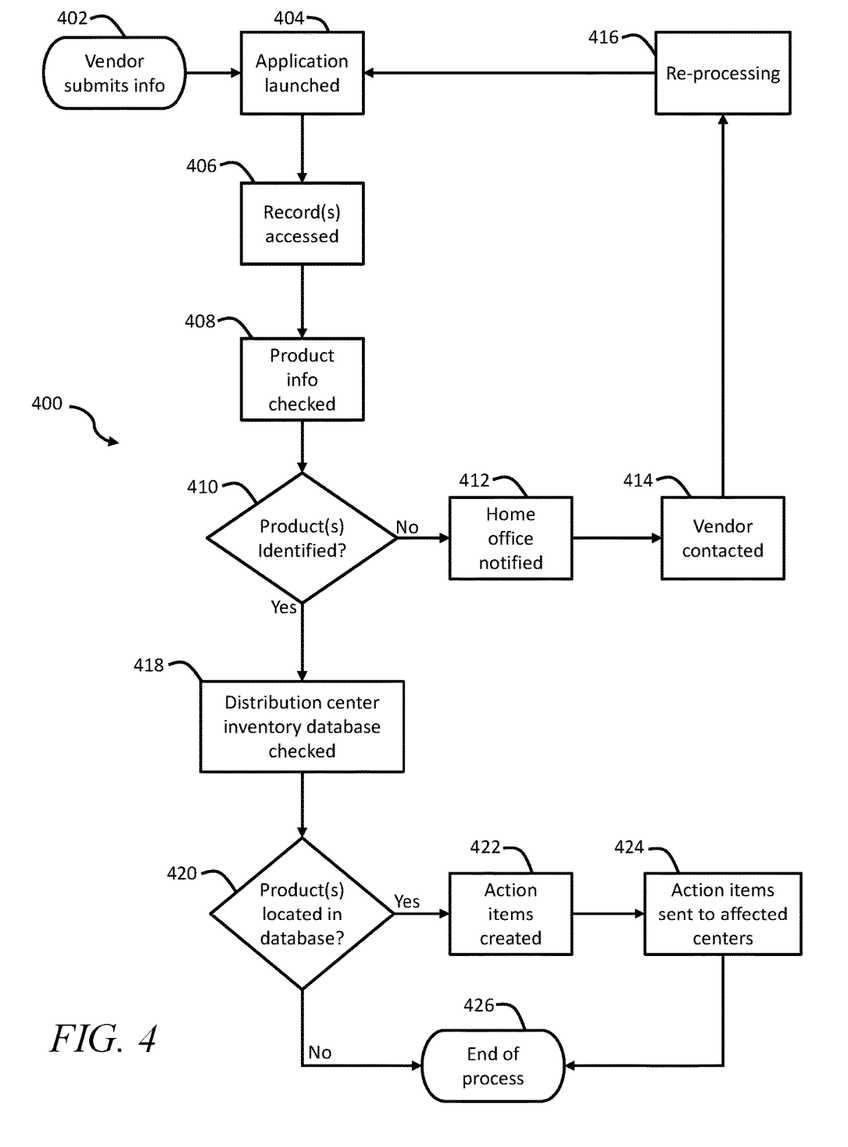
FIG. 4 is a flow diagram in accordance with some embodiments.

Referring to FIG. 4, there is shown a workflow diagram of a process 400 for receiving recall information and for determining product distribution centers affected by the recall. The process 400 shows the procedures and steps at the front end of a product recall, such as at a home office of a retailer operating multiple product distribution centers. The process 400 generally shows interaction with vendors and with generating the information needed by distribution centers to respond to a recall. Process 400 may generally incorporate the components included in systems 100 and 300 and the steps included in process 200.

At block 402, a vendor submits information for a product recall. In one form, it is generally contemplated that this step may constitute an initial notification with some general information about the product recall. Additional information and documents may be subsequently added by the vendor or by the retailer affected by the recall. At block 404, a software application may be launched that is intended to help address the product recall. In one form, it is contemplated that this software application may be part of a system including a cloud-based database communicatively coupled to a website server configured to serve as a platform for the input of the recall information and for the input of actions taken by each product distribution center having products affected by the product recall. The application launches an algorithm to determine, in part, the retailer's affected items/products, as addressed below.

At block 406, product recall records may be accessed in connection with the algorithm to determine the items and product distribution centers of the retailer that are specifically affected by the recall. These records may include the product information provided by the vendor. At block 408, the algorithm may use this product information provided by the vendor to first query the retailer's item database to try to identify the retailer's specific products that are the subject of the recall. The specific products may be identified via any of various types of product identifiers, such as by alphanumeric model strings, universal product codes/barcodes, general product category or type, manufacturer or vendor identification, etc.

At block 410, the algorithm asks if the specific retailer items affected by the recall have been identified. If the answer is no (e.g., the query returns no items, an incomplete list of items, or an inconsistent list of items), the process 400 proceeds to the right side of block 410 to allow the retailer to follow up with the vendor. At block 412, the algorithm transmits a notification (such as an email) to the home office informing the home office that it has been unable to identify the specific retailer items, and at block 414, the home office contacts the vendor for resolution or clarification of the issue. At block 416, following feedback from the vendor, the home office transmits the new product information along with a request for re-processing. In other words, the process 400 re-starts the procedure for determining the specific retailer items affected by the recall based on the vendor's new product information.

At block 410, if it is determined that the specific retailer items have been identified from the vendor information (e.g., the answer is yes), the process 400 continues downwardly from block 410. At block 418, the algorithm creates a second query to the retailer's inventory database(s) to determine the inventory details for the product distribution centers. In other words, the algorithm uses the inventory database(s) to determine which distribution centers have inventory for the affected products, and therefore, to determine which distribution centers are specifically affected by the recall.

At block 420, the algorithm asks if the affected items have been found in the inventory of each product distribution center. If the answer is yes, at block 422, the process 400 creates action items that may be applied to each product or to each product model/type that is identified from the inventory database(s). At block 424, the action items are then transmitted to the affected product distribution centers. In one form, it is contemplated that the action items for each distribution center may be different, depending on the specific products or product models/types at that distribution center. In another form, it is contemplated that the action items may be of a more general nature that will generally be the same for all distribution centers determined to be affected by the recall. At block 426, the process 400 is shown as completed.

From block 420, if it is determined that no distribution centers have affected items (e.g., the answer is no), the process 400 continues to block 426 (the process 400 is completed). In other words, it has been determined that the product recall does not apply to any of the distribution centers. Because the product recall does not apply, no further action need be taken.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for tracking the handling of product recalls by product distribution centers affected by the product recalls, the system comprising:
   a plurality of product distribution centers, each product distribution center receiving a plurality of different types of products from vendors;
   a central home office in communication with the plurality of product distribution centers;
   a first electronic interface at the central home office configured to receive input of recall information from a vendor corresponding to a product recall of a recalled product type;
   a subset of the plurality of product distribution centers having the recalled product type;
   a second electronic interface at each of the subset of product distribution centers configured to receive notifications of product recalls, each second electronic interface configured to allow access to the recall information by the product distribution centers having the recalled product type;
   a recall database configured to receive and store the recall information for the recalled product type and other recall information for other product recalls of other product types;
   a control circuit operatively coupled to the recall database and the first and second interfaces, the control circuit configured to:
      create a record for the product recall in the recall database;
      determine the product distribution centers having the recalled product type and assign the product recall to the subset of product distribution centers;
      transmit a notification regarding the product recall to each product distribution center having products affected by the product recall of the subset of product distribution centers;
      receive confirmation of receipt of the notification from the product distribution centers having products affected by the product recall;
      receive a disposition of an action of the product recall from each of the subset of product distribution centers having the recalled product type; and
      update the recall database with the disposition by each of the subset of product distribution centers having the recalled product type;
   wherein the first interface is accessible to receive input regarding the product recall from one of a predetermined group of vendors and wherein the other recall information for the other product recalls of the other product types in the recall database is not accessible to the predetermined group of vendors.

2. The system of claim 1, wherein the first interface is accessible to receive input regarding the product recall from the central home office and wherein the recall information for each product recall in the recall database is accessible by the central home office.

3. The system of claim 1 wherein the control circuit is configured to transmit recall information inputted by a vendor to the central home office for approval prior to the control circuit transmission of a notification regarding the product recall to each product distribution center having the recalled product type.

4. The system of claim 1, wherein the recall information comprises at least one of a subject of the product recall, a recall classification, a reason for the product recall, documents relating to the product recall, and product recall instructions.

5. The system of claim 1, wherein the control circuit is further configured to determine the product type affected by the product recall and to record the time of the disposition for the product type of the product recall by each product distribution center having the recalled product type.

6. The system of claim 1, wherein the recall database comprises a cloud-based database communicatively coupled to a website server configured to serve as a platform for the input of the recall information and for the input of actions taken by each product distribution center having the recalled product type.

7. The system of claim 1, wherein the second interface at each product distribution center having the recalled product type is configured to input information regarding actions taken by each product distribution center comprising at least one of the number of product units affected by the product recall, products held and not shipped, inspection status of the products, products removed from inventory, products returned to a vendor for refund or modification, destruction of products, and permitted donation of products or portions thereof.

8. The system of claim 1, wherein the control circuit is configured to:
receive a product identifier for the recalled product type that is the subject of the product recall;
access at least one inventory database with inventory data for each product distribution center of the predetermined group of product distribution centers; and
search the at least one inventory database for the product identifier to determine the product distribution centers with the recalled product type.

9. The system of claim 1, wherein the control circuit is configured to:
track the completion of a predetermined group of actions and the disposition status of the actions by the product distribution centers with the recalled product type.

10. A method for tracking the handling of product recalls by product distribution centers affected by the product recalls, the method comprising:
providing a plurality of product distribution centers, each product distribution center receiving a plurality of different types of products from vendors;
providing a central home office in communication with the plurality of product distribution centers;
by a first electronic interface at the central home office, receiving input of recall information corresponding to a product recall of a recalled product type;
by a second electronic interface at each of a subset of product distribution centers, receiving notifications of the product recall;
by the second electronic interface, allowing access to the recall information by the product distribution centers having the recalled product type;
by a recall database, receiving and storing the recall information for the recalled product type and other recall information for other product recalls of other product types;
by a control circuit:
creating a record for the product recall in the recall database;
determining the product distribution centers having the recalled product type and assigning the product recall to the subset of product distribution centers;
transmitting a notification regarding the product recall to each product distribution center of the subset of product distribution centers;
receiving confirmation of receipt of the notification from each of the subset of product distribution centers having the recalled product type;
receiving a disposition of an action of the product recall from each of the subset of product distribution centers having the recalled product type; and
updating the recall database with the disposition by each of the subset of product distribution centers having the recalled product type;
wherein the first interface is accessible to receive input regarding the product recall from one of a predetermined group of vendors and wherein the recall information for other product recalls in the database is not accessible to the predetermined group of vendors.

11. The method of claim 10, wherein the first interface is accessible to receive input regarding the product recall from the central home office and wherein the recall information for each product recall in the recall database is accessible by the central home office.

12. The method of claim 10, further comprising, by the control circuit, transmitting recall information inputted by a vendor to the central home office for approval prior to the control circuit transmission of a notification regarding the product recall to each product distribution center having the recalled product type.

13. The method of claim 10, wherein the recall information comprises at least one of a subject of the product recall, a recall classification, a reason for the product recall, documents relating to the product recall, and product recall instructions.

14. The method of claim 10, further comprising, by the control circuit, determining the product type affected by the product recall and recording the time of the disposition for the product type of the product recall by each product distribution center having the recalled product type.

15. The method of claim 10, wherein the database comprises a cloud-based database communicatively coupled to a website server configured to serve as a platform for the input of the recall information and for the input of actions taken by each product distribution center having the recalled product type.

16. The method of claim 10, wherein, by the second interface at each product distribution center having the recalled product type, inputting information regarding actions taken by each product distribution center comprising at least one of the number of product units affected by the product recall, products held and not shipped, inspection status of the products, products removed from inventory, products returned to a vendor for refund or modification, destruction of products, and permitted donation of products or portions thereof.

17. The method of claim 10, further comprising, by the control circuit:
receiving a product identifier for the recalled product type that is the subject of the product recall;
accessing at least one inventory database with inventory data for each product distribution center of the predetermined group of product distribution centers; and
searching each inventory database for the product identifier to determine the product distribution centers with the recalled product type.

18. The method of claim 10, further comprising, by the control circuit:
tracking the completion of a predetermined group of actions and the disposition status of the actions by the product distribution centers with the recalled product type.

* * * * *